J. VAN OOSTERWYCK.
TUBULAR BOILER.
APPLICATION FILED OCT. 1, 1909.

1,004,315.

Patented Sept. 26, 1911.
8 SHEETS—SHEET 1.

J. VAN OOSTERWYCK.
TUBULAR BOILER.
APPLICATION FILED OCT. 1, 1909.

1,004,315.

Patented Sept. 26, 1911.
8 SHEETS—SHEET 5.

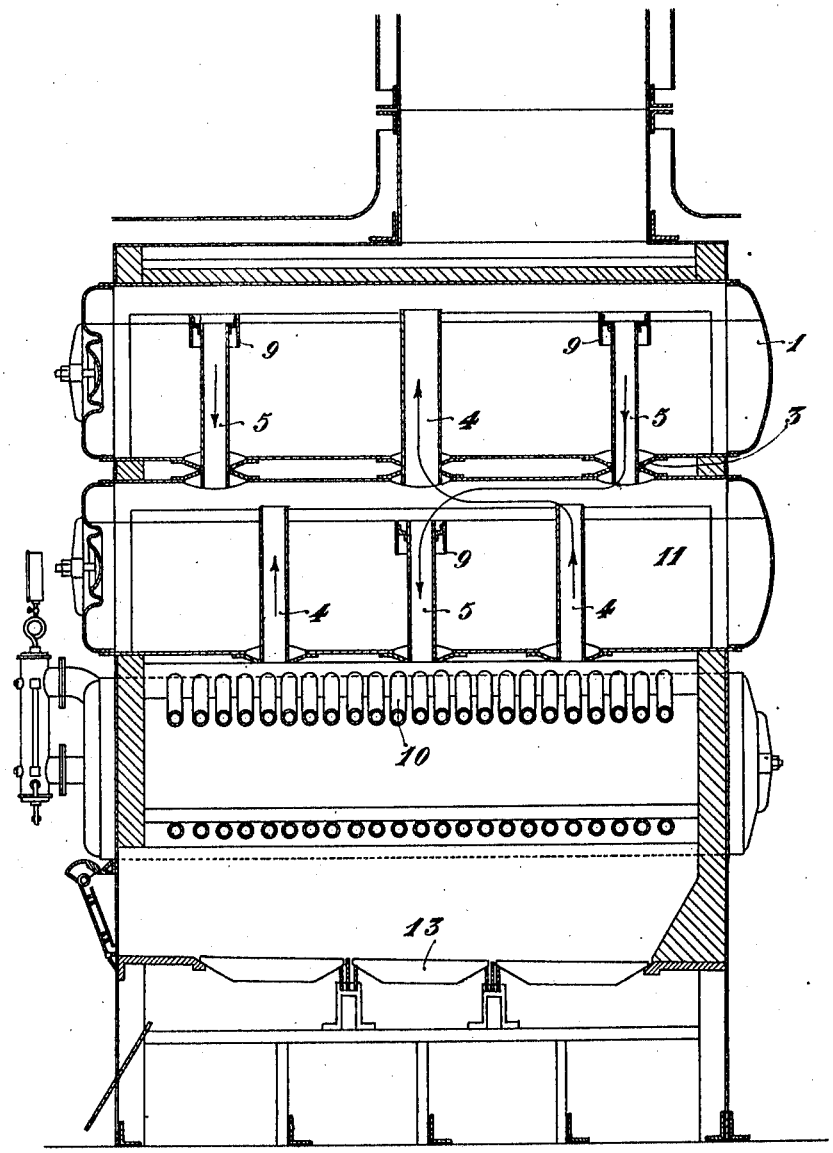

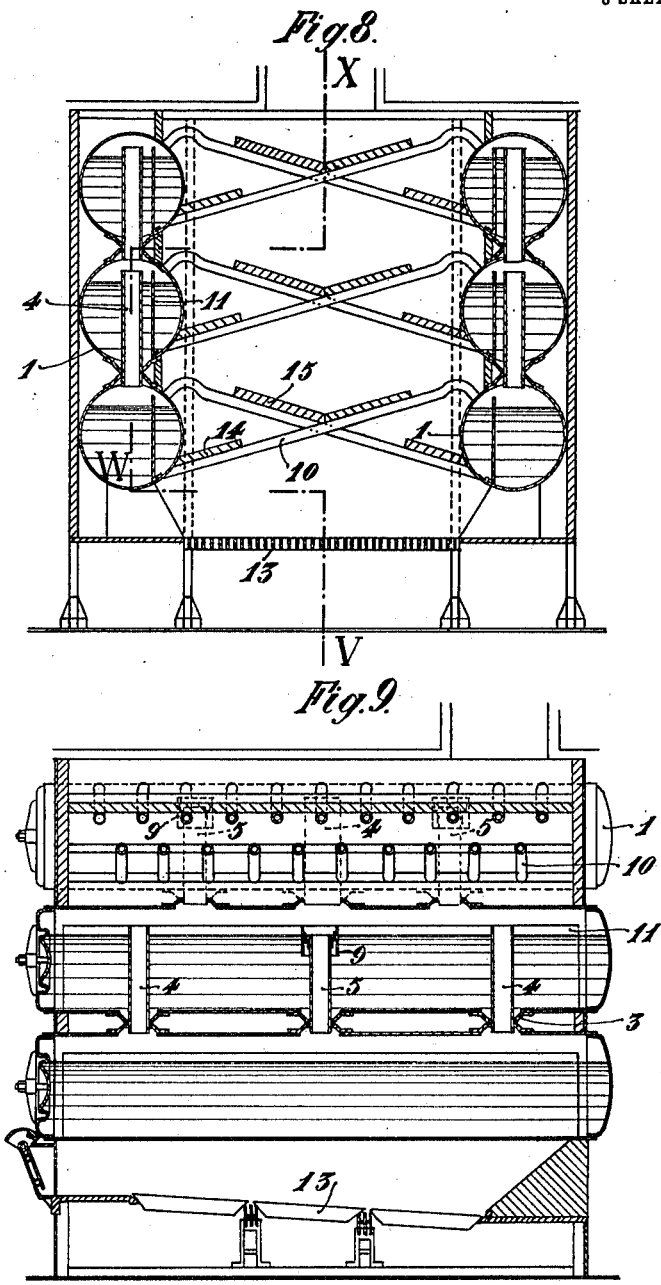

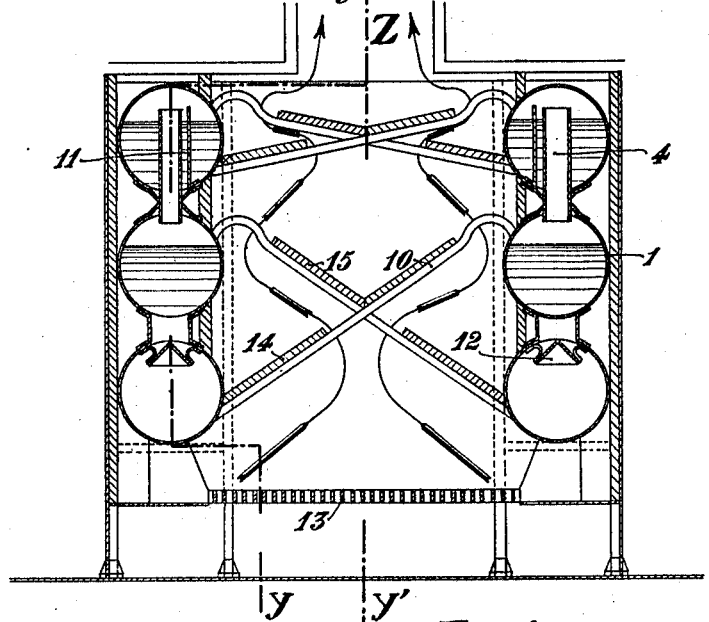
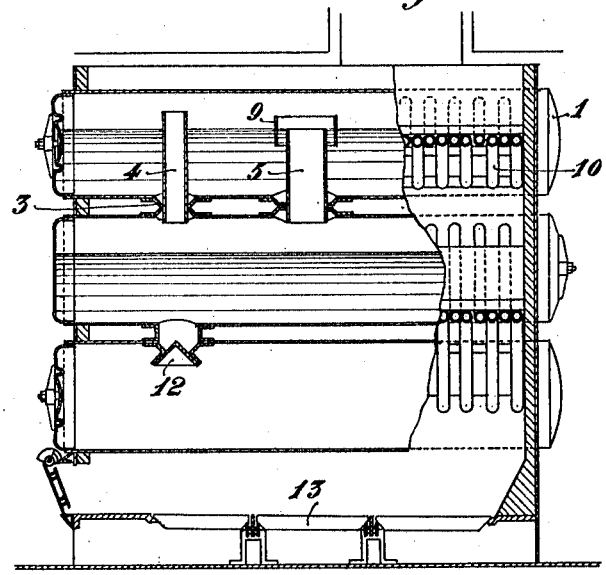

UNITED STATES PATENT OFFICE.

JEAN VAN OOSTERWYCK, OF LIEGE, BELGIUM.

TUBULAR BOILER.

1,004,315.  Specification of Letters Patent.  Patented Sept. 26, 1911.

Application filed October 1, 1909. Serial No. 520,500.

*To all whom it may concern:*

Be it known that I, JEAN VAN OOSTERWYCK, subject of the King of Belgium, residing at Liege, Belgium, have invented certain new and useful Improvements in Tubular Boilers; and I do hereby declare the following to be a full, clear, and exact description of the invention.

This invention relates to improvements in tubular boilers, and has for its object to provide a tubular boiler whereby absolutely dry steam is produced.

Figure 1:
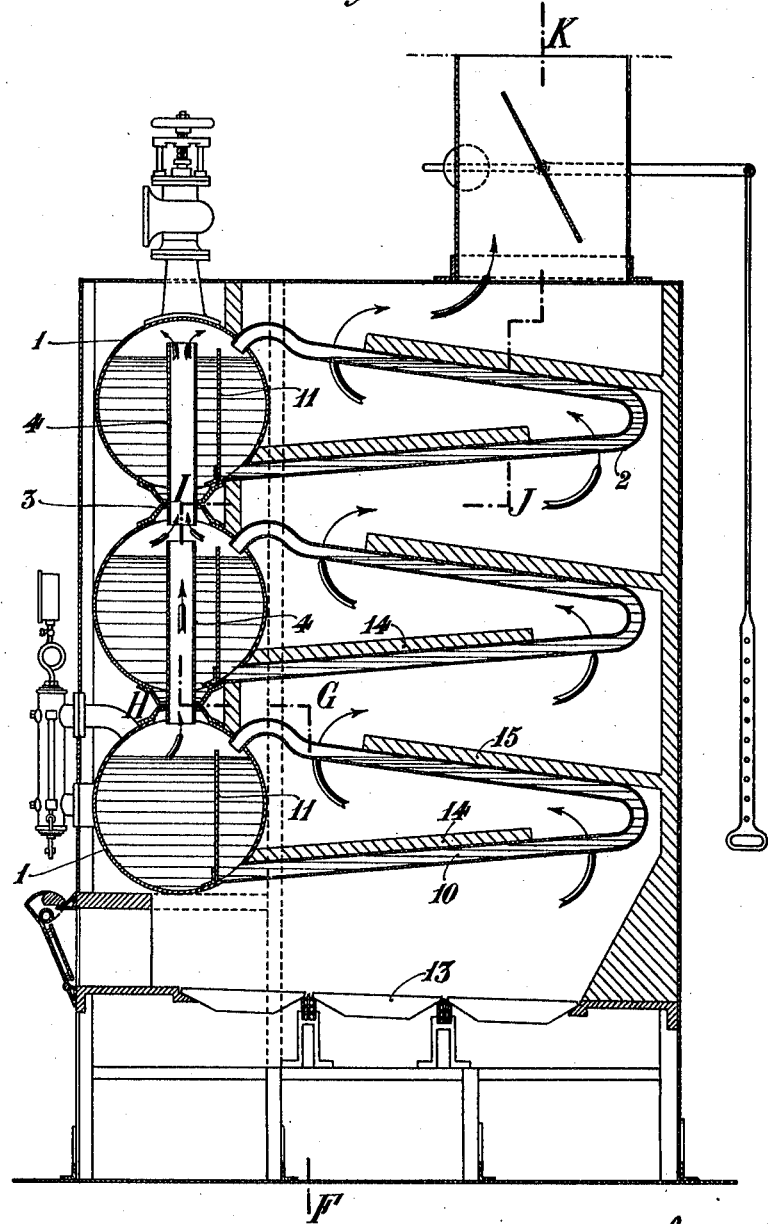
Figure 2:
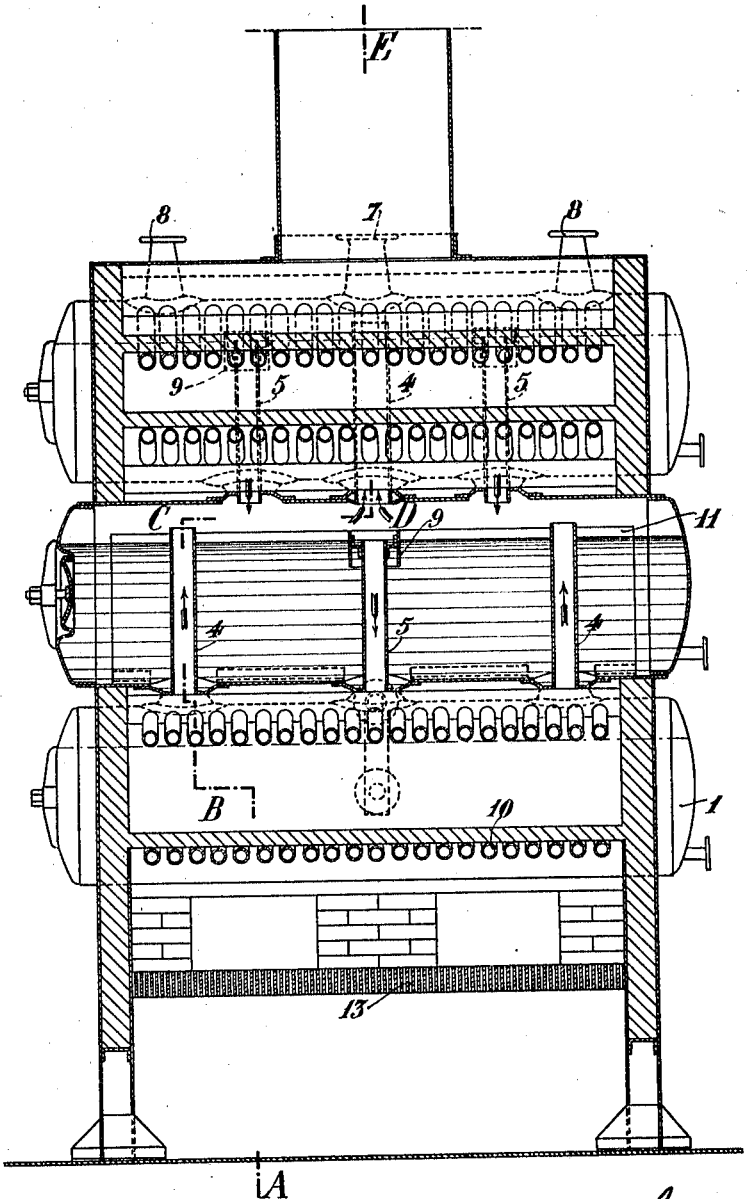
Figure 3:
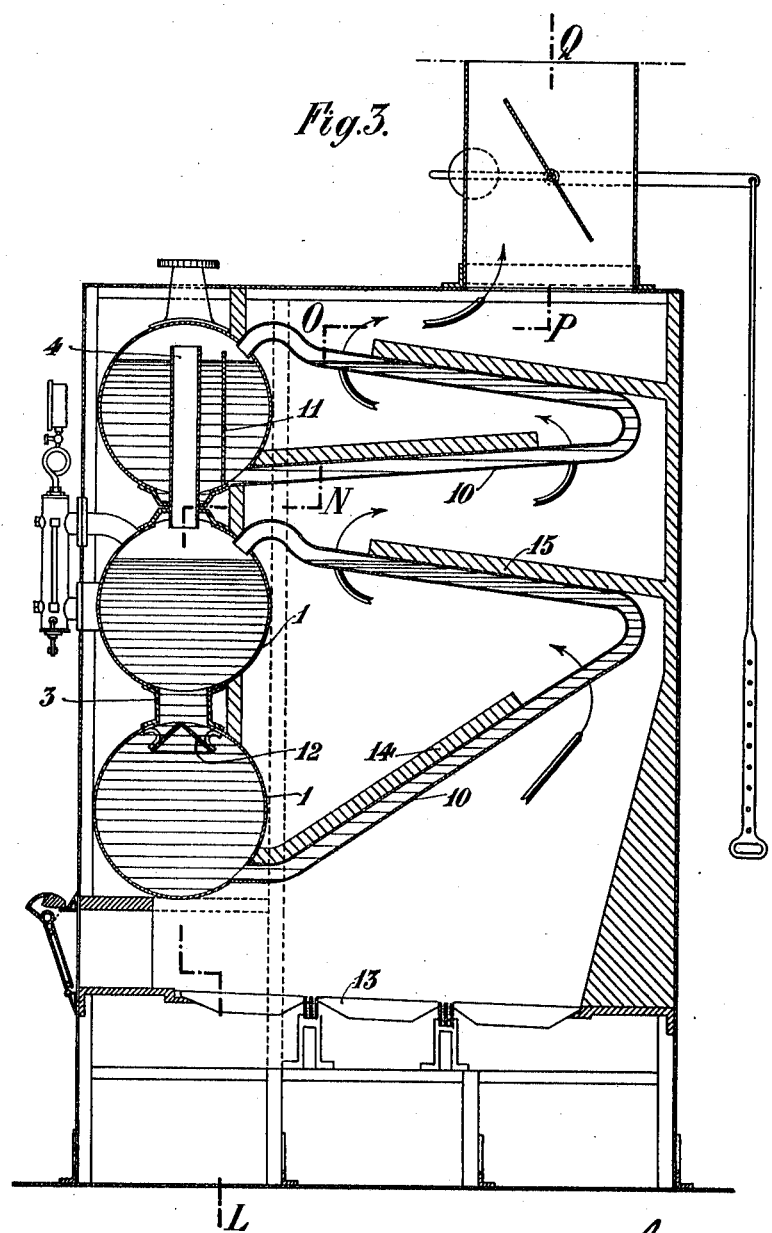
Figure 4:
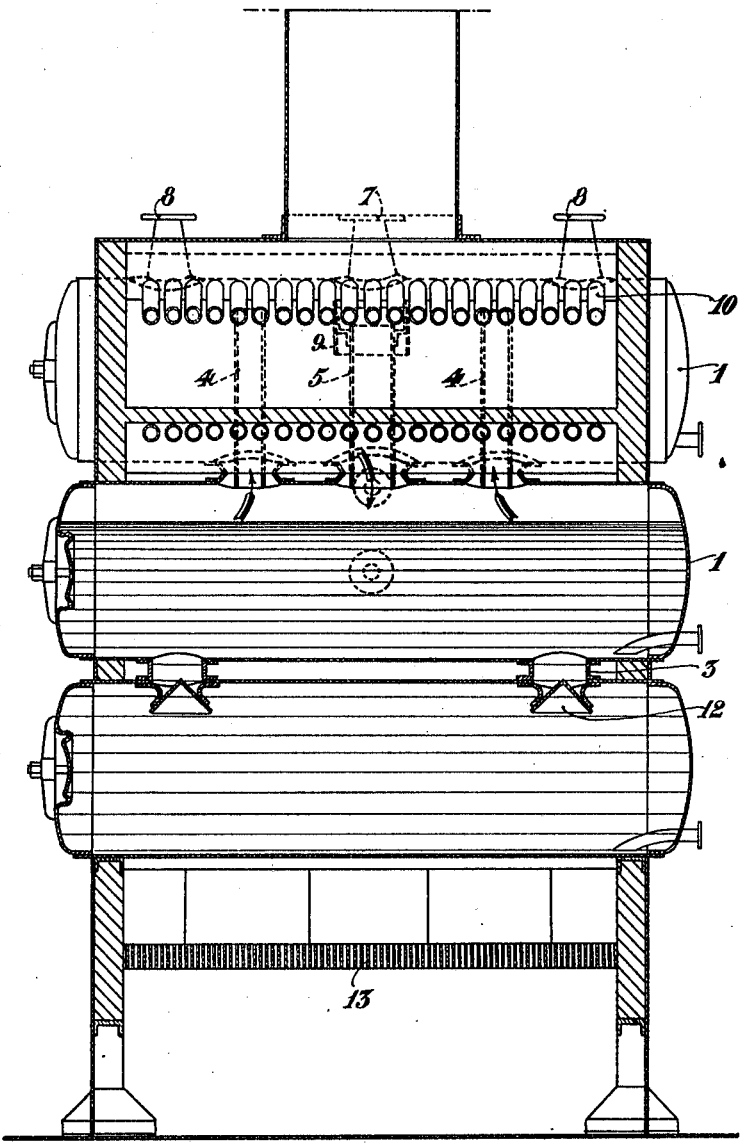
Figure 5:
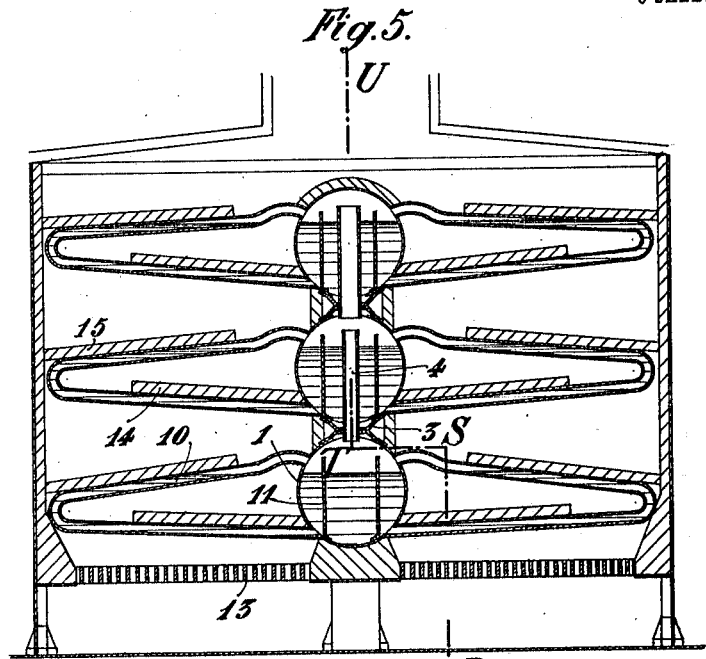
Figure 7:
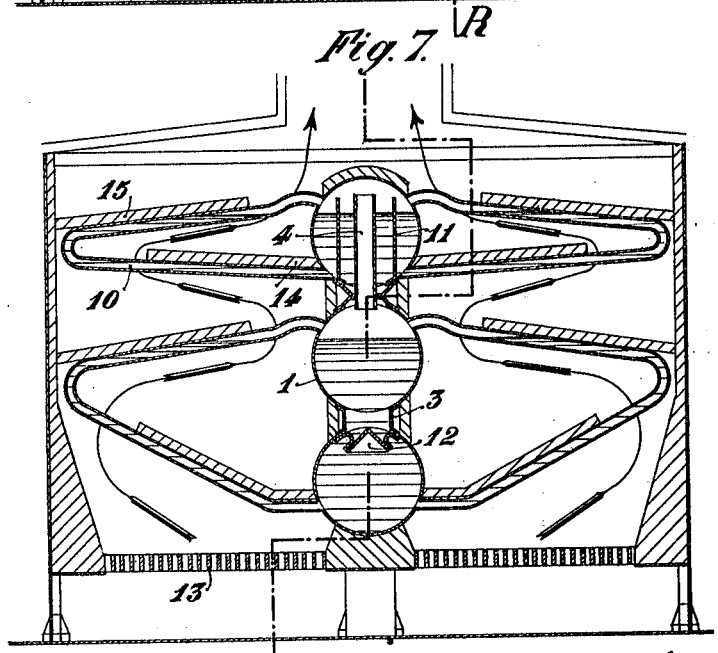

In the accompanying drawings—Figure 1 is a longitudinal section, taken upon the dotted line A—B—C—D—E (Fig. 2) of a boiler constructed in accordance with the invention; Fig. 2 is a transverse vertical section taken upon the dotted line G—H—I—J—K (Fig. 1); Fig. 3 is a section similar to Fig. 1 of a modification; Fig. 4 is a section taken on the line L—N—O—P—Q (Fig. 3); Fig. 5 is a longitudinal sectional view of a slightly different form; Fig. 6 is a section taken upon the dotted line R—S—T—U (Fig. 5) upon an enlarged scale; Fig. 7 is a sectional view of another embodiment of the invention; Fig. 8 illustrates another slightly different form; Fig. 9 is a section of Fig. 8 upon the line V—W—X; Fig. 10 shows a somewhat modified form of the boiler illustrated in Fig. 8; Fig. 11 is a partial transverse section of Fig. 10 upon the lines Y—Z and Y¹—Z.

In all the types represented, the boiler consists of two principal and distinct elements, viz., the steam and water drums 1, and the water tubes or generating tubes 2, which together form a steam-producing element. Any desired number of these steam-producing elements are superimposed and the steam and water drums are connected by the short vertical tubes 3, or other suitable means, which permits of intercommunication between them so that they constitute practically a single closed vessel. This result is attained by disposing, in the connecting tubes 3, or the like, tubes 4 which serve to collect the steam and conduct it to the top of the boiler, and by tubes 5 whereby water is fed to each steam-producing group. These connections for steam and water may obviously be arranged either inside the steam and water drums, as shown in the drawings, or on the outside of the said drums.

In order that steam may be generated under the most advantageous conditions, it is necessary that the generating or vaporizing tubes and the feed tubes should be arranged in certain defined positions within or upon the drums. The tubes 4, through which steam from the bottom drum 1 is delivered to the superimposed drums, are placed toward the two extremities of the said drum, as shown in Fig. 2, in such a manner as to insure the rapid liberation of the steam produced, while the steam tubes 4 of the second or next higher steam producing group are arranged in the middle of the drum if it is a single one, or in different vertical planes with reference to the steam tubes of the drums above and below. This arrangement methodically prevents priming or the drawing of water into the steam tubes, such as would otherwise be liable to occur on the stopping and starting of machines, as any globules of water which may be drawn into the steam tubes of any drum are, on being discharged with steam from the tubes, projected against the wall of the drum and thereby deprived of their energy and intercepted.

In cases where the steam delivery tubes are arranged externally of the boiler tubes, the jet of steam is discharged toward the volume of water by a tube which is bent in the downward direction, or else it is directed toward the crown of the boiler tube by an upwardly bent nozzle or beak so as to obtain a similar intercepting effect and prevent priming. The dome communicates with the top drum 1 through a union 7, while the feed water connections are made by unions 8; or the arrangement may be reversed. The feeders 5 are arranged so that the water enters the drums in a direction contrary to the movement of the steam in its passage from one drum to another, as indicated by the arrows in Fig. 2. By this arrangement the water descending through the tubes 5 of the upper drum (referring to Fig. 2) will have to pass through the jets of vapor passing from the upper ends of the tubes 4 in said lower drum to the tube 4 of the upper drum. That is, feed water supplied to the lower drum is caused to move directly through the body of steam or vapor passing from said lower drum to the next higher drum. This arrangement, which produces a certain condensation and consequently partial vacuum, causes a vaporization of the liquid water molecules as they enter.

The feed tubes 5 are advantageously provided at their upper ends with scum intercepting caps 9 which are adapted to prevent the passage, into the bottom of the boiler, of magnesia, or oil or other scum. Such caps, each consisting of a crown with annular walls, only admit into the tubes 5 water from a certain depth below the normal level of the water contained in the drum pertaining to such tubes. On the drum of each steam producing element, there are fixed (either by expanding the tube end, or by suitable threads or ferrules) the water or generating tubes 10, which may either have the curved form shown in Figs. 1 to 6, or be straight, as in Figs. 8 and 11.

In the boiler shown in Figs. 1 and 2, the lower branch of each of the generating tubes 10 extends from the lower part of the drum 1, while the upper branch of each tube terminates in the steam space of the drum. Further, the extremity of each upper branch is curved, or made in the form of a hook, and its outlet is presented or directed to the surface of the water so as to facilitate the escape of any water that may be driven into the tube by the steam. The circulation of water in the tubes 10 of each steam producing element is facilitated by the application to the interior of the tubular boiler elements of vertical screens or baffles 11, that extend from the bottom nearly to the top of each of the elements 1 near the side where the vaporizing tubes are connected. These screens, to a certain extent, separate the body of the water which is neutral from that which is in an active condition and also prevent the formation of beads in the tubes 10 by the alternation therein of bodies of water and bodies of steam. By thus restricting, by the aid of the screens, the space occupied by the water between the outlet ends of the tubes 10 and the walls of the drums, the mixture of water and steam that is thrown forcibly by the curved ends of the generating tubes 10 is endowed with an active force sufficient to oppose and prevent the driving back of the water by the steam in the top of each drum and also to aid or promote the circulation of water in the normal direction through the drums and tubes. In the example, Figs. 1 and 2, each steam producing element is constituted by a single drum and its generating tubes 10.

The arrangement, Figs. 3 and 4 is essentially analogous to that of Figs. 1 and 2, the difference being that the lower steam producing element contains a double volume of water by reason of the fact that it consists of two drums 1 connected together in such a manner that water may circulate direct from the upper to the lower one of each couple. The screens 11 are omitted from these connected lower elements and in place thereof a resistance or baffle cone 12 is arranged beneath each of the vertical connecting tubes or water passages 3. This baffle cone is hollow, and is placed with its apex uppermost and opposed to the center of the connection 3, while its base is sufficiently extended to offer such resistance to the ascent of the water as will prevent the same rising from the lower drum 1 to the superimposed one and thereby aid in preserving the circulation of the water in the normal direction.

In the construction shown in Figs. 1 and 2, the hot gases from the furnace 13 are directed toward the middle parts of the tubes 10 by the aid of the baffle plates 14 and toward the crooked ends of the said tubes by the baffle plates 15 for the special purposes hereinafter referred to. It will be understood that it is possible to so heat a water tube that a certain mass of the liquid receives an insufficient amount of heat from the furnace, and is consequently not vaporized as rapidly as other portions of the liquid, and may therefore be driven back by the pressure of the steam that is formed in the more highly heated parts of the tube. Such volume of steam, which would occupy the entire section of the tube, would not only stop the circulation of the water but would leave the tube momentarily dry, which is dangerous. If, on the other hand, one applies the greatest heat at the point where the steam is disengaged, or discharged, this drying is rendered impossible because the equilibrium between the steam and water pressures is not disturbed. To realize this heating effect it is necessary to avoid, as far as possible, the application of the greatest heat to the parts of the tubes at which the circulating water first enters, and this is attained by the baffle plate above described. In effect, all the hot gases are directed toward the middle parts of the tubes 10 and against the upper branches of said tubes, in which the water is rapidly vaporized and replaced, in proportion to its discharge, by the water from the drums 1. Furthermore during its passage through the bent or hooked parts of the tubes 10, the water is subjected to a considerable afflux of heat or a maximum heating effect which also contributes to intensive evaporation and to the drying of the steam or the prevention of priming. The baffle plates are also disposed in such a fashion as to cause the burning gases to travel a maximum distance without transforming the same into smoke. It may be considered that, in effect, the extremities of the plates 14 and 15 resemble the nozzles of burners past which the flames travel at a relatively high speed through passages of relatively small section and that from such restricted passages the gases enter large expansion chambers in which they expand and are mixed before proceeding, with enhanced velocity, through the next narrow passage, after which they expand afresh in the next chamber, and so on until their discharge into the chimney. This arrangement of baffle plates 14 and 15 and successive restrictions and expansion chambers within the inclosed space formed by the masonry and walls of the boiler, insures that the heat is imparted to and effectively utilized in the working parts of the boiler while the chimney receives neither gases at a high temperature nor any appreciable quantity of unutilized carbon.

Figs. 5 and 6 show a boiler analogous to that shown in Figs. 1 and 2, but having the vaporizing tubes 10 on opposite sides of the drums 1, and likewise, Fig. 7 shows a boiler analogous to that represented in Figs. 3 and 4; the two lower drums 1 being connected or arranged as a double water drum.

Figs. 8 and 9 represent an arrangement wherein systems of straight generating tubes 10 make the connections between two sets of drums 1 and $1^1$, each tube extending from the bottom of the drum on the one side and terminating at its hooked extremity in the steam chamber at the top of the corresponding element on the other side. The drawings show, by way of example, a boiler constructed of three superimposed steam producing elements.

In the modification illustrated in Figs. 10 and 11, the straight tubes are shown applied to a boiler having double or connected water drums. The equal heating of both the middle parts and the bent delivery ends of the tubes is effected by means of the baffle plates 14 and 15.

The action of the boilers above described is as follows: When the fire is started in the furnace, the hot gases ascend and play upon the middle parts of the vaporizing tubes of the lower steam producing element in such a manner (as has already been explained) that should the steam produced at this point form a froth with the circulating water, such froth, on arriving at the bent end of the tube, is subjected to the maximum heating effect at such end and is thereby thoroughly dried. The same action occurs in each steam producing element, but with progressively decreasing intensity as the hot gases proceed through the interior of the boiler. The steam produced in the tubes, as well as the water carried along with it, on being discharged from the ends of the tubes is projected downwardly toward the level of water in the drums 1. Steam is collected in the steam spaces and ascends through the tubes 4, while the water is intercepted. Further, any atomized water or froth that may be carried up with the steam is projected against the top walls of the drums from the upper ends of the steam tubes 4 and is also eliminated mechanically. The dried steam, in proceeding from the one drum to the next above it and thence to the dome, travels in the opposite direction to the streams of water which enter by the feed tubes 5. The curved or hooked form which is given to the ends of the generating tubes and the separation of the water contained in the drum promotes the circulation of water in the tubes, and the feed water is always delivered into each drum in such a manner that it does not interfere with the circulation from the said drums to the generating tubes. The water is kept at the same level on both sides of the screens 11 as the latter are arranged so that a sufficient passage or communication is left at the two extremities. All mud or like suspended solid matter is deposited in the non-active parts of the drums where they are not subjected to any agitation and are not liable to be carried into the generating tubes.

Having thus described the invention, what is claimed is:

1. In a steam generator, the combination with a plurality of drums arranged one above the other, of steam and water tubes connecting adjacent drums to conduct steam from the lower to the upper drum and water from the upper to the lower of said drums, said tubes being so arranged that the water entering the lower drum is caused to move through the body of steam passing through the steam space of said drum to the drum above.

2. In a steam generator, the combination with a plurality of water and steam drums, arranged one above the other, of tubes connecting the steam spaces of adjacent drums, and other tubes connecting the water space of one drum with the steam space of the other of said drums, the relative arrangement of said tubes being such that water and steam are caused to move in opposite directions and on intercepting paths through the steam space in the lower drum.

3. In a steam generator, the combination of a plurality of drums arranged one above the other, and steam and water tubes connecting adjacent drums and so related that steam moving longitudinally of a lower drum is caused to pass through the feed water entering said drum.

4. In a steam generator, the combination of a plurality of horizontally arranged drums placed one above the other, and connected by suitable steam and water ducts, a plurality of tubes projecting laterally from each drum and having their ends connected respectively with the water and steam spaces of the drum, and a baffle in each drum forming therein two communicating chambers of different capacities, the laterally projecting tubes communicating with the smaller of said compartments.

5. In a steam generator, the combination of a plurality of drums arranged one above the other, steam and water tubes connecting adjacent drums, external tubes connecting the water and steam spaces of the upper of two adjacent drums and having their upper ends bowed or curved to discharge steam downwardly into the drum, and a baffle in said upper drum forming therein two communicating compartments of different capacities, the smaller of which receives the discharge from said external tubes.

6. In a steam generator, the combination of a series of three drums arranged one above the other, water tubes connecting the two lower drums, cone-shaped baffles arranged at the lower ends of said tubes, external tubes connecting the lower drum with the upper portion of the second drum, steam tubes connecting the steam spaces of the upper and intermediate drums, water tubes leading from the water space of the upper drum to the steam space of the second drum, external tubes connecting the water and steam spaces of the upper drum, and a baffle arranged within the upper drum to provide therein two communicating compartments of different capacities, the one of smaller capacity receiving the discharge from the last said external tubes.

7. In a steam generator, the combination of three drums arranged one above another, and steam and water tubes connecting adjacent drums, the tubes for conducting steam from the lower to the intermediate drum being arranged on opposite sides of the tube for conducting water from said intermediate drum to the lower drum and the tube for conducting steam from the intermediate to the upper drum being arranged between feed water tubes connecting the upper and intermediate drums.

8. In a steam generator, the combination of three drums arranged one above another, and steam and water tubes connecting adjacent drums, said tubes being so arranged that the connections for both water and steam are arranged alternately adjacent the ends and the middle portions of the drums, substantially as and for the purposes described.

In testimony whereof I affix my signature in presence of two witnesses.

JEAN VAN OOSTERWYCK.

Witnesses:
PIERRE BROUHON,
A. PENDLETON CRUGER.

---

Copies of this patent may be obtained for five cents each, by addressing the "Commissioner of Patents, Washington, D. C."